(12) United States Patent
Kawamura

(10) Patent No.: US 8,189,896 B2
(45) Date of Patent: May 29, 2012

(54) ALIGNMENT APPARATUS FOR ALIGNING RADIATION IMAGES BY EVALUATING AN AMOUNT OF POSITIONAL SHIFT, AND RECORDING MEDIUM STORING A PROGRAM FOR ALIGNING RADIATION IMAGES

(75) Inventor: Takahiro Kawamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 610 days.

(21) Appl. No.: 12/390,055

(22) Filed: Feb. 20, 2009

(65) Prior Publication Data

US 2009/0214091 A1 Aug. 27, 2009

(30) Foreign Application Priority Data

Feb. 21, 2008 (JP) .................. 2008-040210

(51) Int. Cl.
*G06K 9/00* (2006.01)
*G06K 9/32* (2006.01)
(52) U.S. Cl. ....................... 382/132; 382/294

(58) Field of Classification Search .......... 382/128–134, 382/294
See application file for complete search history.

(56) References Cited

U.S. PATENT DOCUMENTS

| 6,067,373 A * | 5/2000 | Ishida et al. .................. 382/130 |
| 6,661,873 B2 | 12/2003 | Jabri et al. |
| 7,068,826 B2 * | 6/2006 | Jabri et al. ..................... 382/128 |

FOREIGN PATENT DOCUMENTS

| JP | 2000-342558 A | 12/2000 |
| JP | 2005-245657 A | 9/2005 |

\* cited by examiner

*Primary Examiner* — Thanh X Luu
(74) *Attorney, Agent, or Firm* — Sughrue Mion, PLLC

(57) ABSTRACT

An alignment apparatus and a program that improve the accuracy of alignment between two radiation images are provided. For each of portions of the two radiation images, evaluation means calculates an evaluation value that evaluates an amount of positional shift regarding a tissue radiographed in the radiation images, and search condition setting means sets for each of the portions a condition of search for corresponding positions between the two radiation images based on the evaluation value. According to the search condition having been set, alignment means searches for the corresponding positions between the two radiation images, and aligns the two images by warping at least one of the radiation images.

10 Claims, 7 Drawing Sheets

FIG.6
LARGE POSITIONAL SHIFT 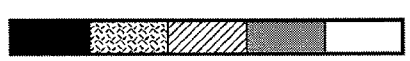 SMALL POSITIONAL SHIFT

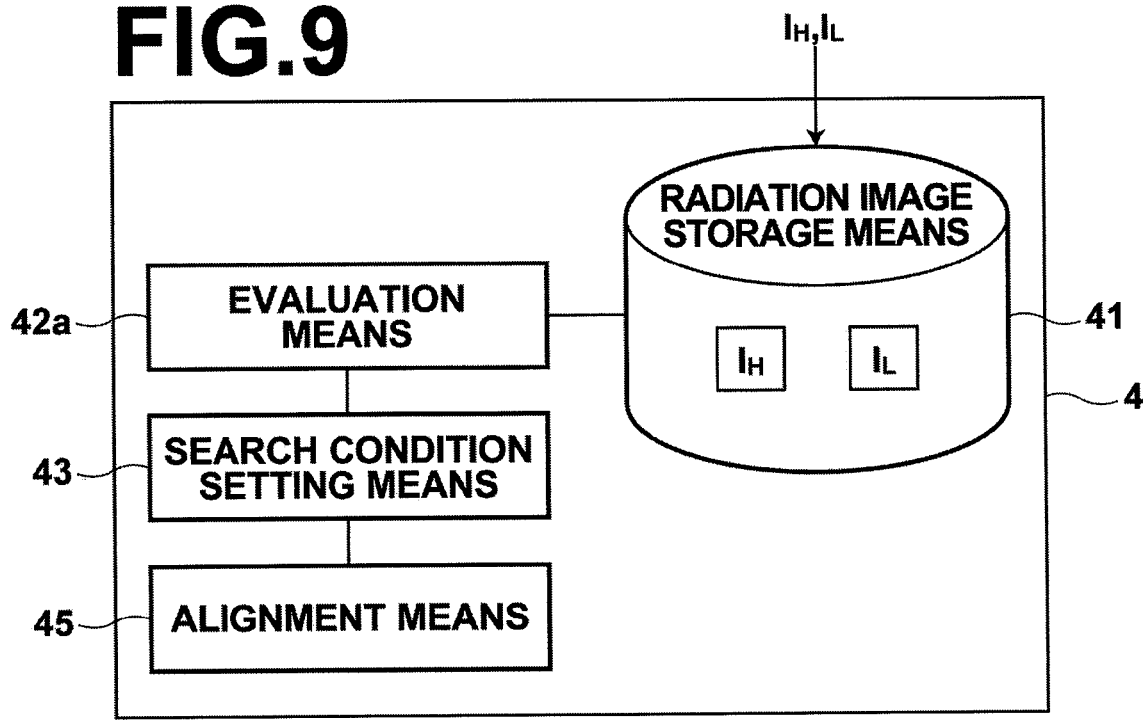
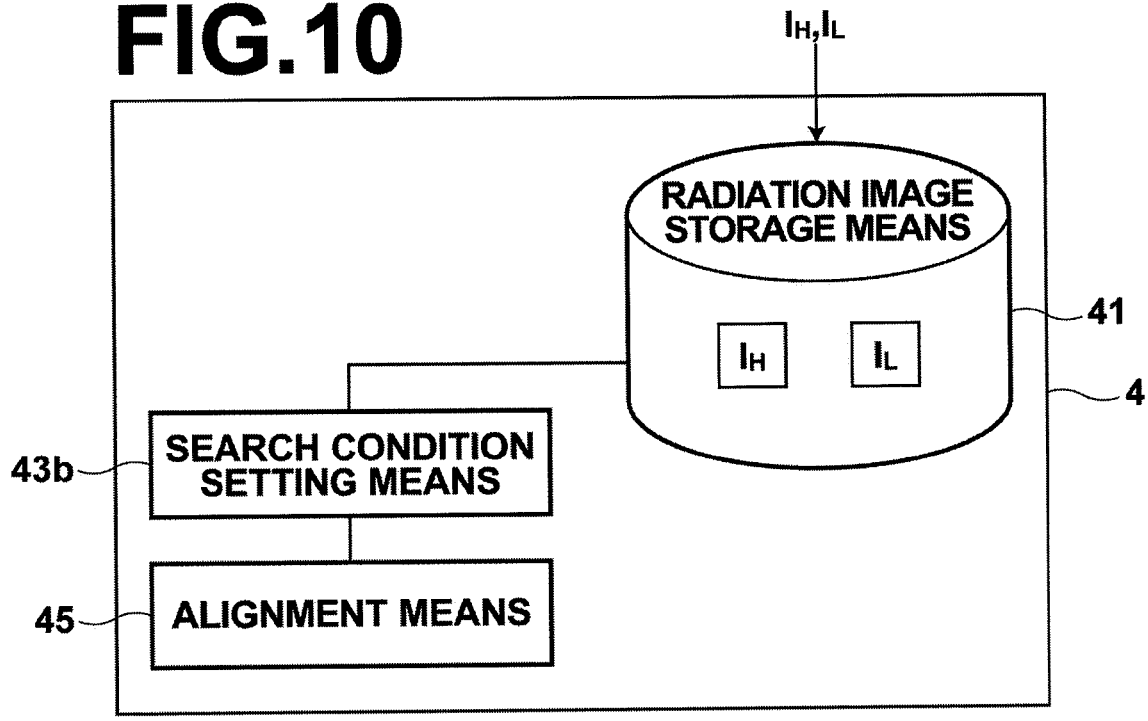

ALIGNMENT APPARATUS FOR ALIGNING RADIATION IMAGES BY EVALUATING AN AMOUNT OF POSITIONAL SHIFT, AND RECORDING MEDIUM STORING A PROGRAM FOR ALIGNING RADIATION IMAGES

BACKGROUND OF THE INVENTION

1. Field of the Invention

The present invention relates to an alignment apparatus for accurately aligning a plurality of medical images and to a program therefor.

2. Description of the Related Art

Using the fact that attenuation of a radiation having passed through a subject becomes different depending on a material comprising the subject, energy subtraction processing has been known wherein two component images comprising different signal components are separated from two radiation images obtained by irradiation of high and low energy radiations on a subject. According to such energy subtraction processing, soft tissue images can be generated by removing bones from chest radiation images, and shadows in soft tissues can be observed without being blocked by the bones, for example.

In the case where radiation images of high and low energy used in such energy subtraction processing are radiographed by two-shot method, a high-energy radiation and a low-energy radiation are irradiated on a subject at an interval of several hundred milliseconds. However, if the subject moves during the radiography, a position thereof becomes different between the images. Therefore, a component image generated by subtraction processing includes an artifact.

In order to reduce artifacts caused by alignment errors in energy subtraction processing, an alignment method carrying out non-linear transformation on either one of images before subtraction processing has been proposed. More specifically, registration by template matching is used. In registration using template matching, a local region of either one of images is cut as a template, and a region corresponding to the template is searched for in the other one of the images, to find how each pixel has moved (that is, a shift vector). Based on the shift vector, warping is carried out for registration. By finding the shift vectors for all pixels in one image, the pixels can be related to all pixels in the other image. However, in consideration of computational efficiency and alignment accuracy, control points are generally disposed to form a grid-like pattern, and shift vectors are found at the control points. Pixels between the control points are related to each other in the two images by interpolation of the surrounding shift vectors, and the images are aligned by warping according to the correspondence between the pixels.

In template matching, a correlation value between two images is used to find a region that corresponds to a template. However, finding only a similar region may not represent accurate correspondence, leading to mal-registration. Therefore, in order to solve this problem of mal-registration, a method has been proposed in U.S. Pat. No. 6,661,873, for example. In this method, a preliminary soft-tissue template is generated from two-shot images by using subtraction processing, and edge intensity therein is used as a criterion for alignment.

Alternatively, another method to reduce mal-registration has been proposed in Japanese Unexamined Patent Publication No. 2000-342558. In this method, tissues are divided in advance into regions in alignment processing before subtraction processing. Degrees of similarity between the regions are found to find a degree of similarity between a template and a radiation image, and a result of weighted addition of the degrees is then used as a criterion for alignment.

In the template matching described above, a size of a template to be cut, a similarity (an alignment criterion) to the template, a region of template matching, and the accuracy of template matching affect the final accuracy of alignment and computational cost. Therefore, optimal parameter setting is required.

However, in the case of two-shot radiography, an organ in motion such as the heart deforms more greatly than other regions, and accurate alignment is not realized even in the case of applying the same criteria to entire images. For example, in two-shot energy subtraction processing using a flat panel detector (FPD), the interval of two-shot radiography is approximately 200 to 500 milliseconds. However, the heart rate at rest is approximately 60 to 70 for men and 65 to 75 for women, meaning that one heartbeat takes about 800 milliseconds to 1 second. Therefore, since the heart is always in motion, a region around the heart changes substantially.

SUMMARY OF THE INVENTION

The present invention has been conceived based on consideration of the above circumstances. An object of the present invention is therefore to provide an alignment apparatus and a program that improve the accuracy of alignment between two radiation images.

An alignment apparatus of the present invention comprises:

radiation image storage means for storing two radiation images obtained by irradiating radiations on a predetermined body part including two or more tissues;

evaluation means for calculating an evaluation value that evaluates an amount of positional shift of the radiographed tissues between the two radiation images, in each of portions of the two radiation images;

search condition setting means for setting for each of the portions of the two radiation images a condition of search for corresponding positions between the two radiation images, according to the evaluation value obtained by the evaluation means regarding a corresponding one of the portions of the radiation images; and alignment means for aligning the two radiation images by searching for the corresponding positions according to the search condition having been set and by warping at least one of the radiation images.

A program of the present invention is a program that causes a computer to function as:

evaluation means for calculating an evaluation value that evaluates an amount of positional shift of two or more tissues radiographed in two radiation images obtained by irradiating radiations on a predetermined body part including the two or more tissues, in each of portions of the two radiation images;

search condition setting means for setting for each of the portions of the two radiation images a condition of search for corresponding positions between the two radiation images, according to the evaluation value obtained by the evaluation means regarding a corresponding one of the portions of the radiation images; and alignment means for aligning the two radiation images by searching for the corresponding positions between the two radiation images according to the search condition having been set and by warping at least one of the two radiation images.

The body part refers to a predetermined body part of a subject such as a human or an animal.

The tissues constitute the predetermined part of the body of the subject, and each of the tissues refers to an aggregation of cells of similar structure. For example, the tissues refer to organs such as bones, lungs, and the heart, and to a group of organs such as soft tissues.

The positional shift is observed between positions of the same tissue that is supposed to be at the same position in the two images and resulted from a movement of the subject relative to an image recording medium at the time of radiography, or from a motion of an organ. The image recording medium refers to a recording medium in which an image is recorded in accordance with an amount of radiation having passed through the subject. More specifically, the image recording medium is an imaging plate, a flat panel detector, or a film, for example.

The evaluation value that evaluates the amount of positional shift refers to a value that represents a magnitude or degree of the positional shift.

Aligning the two radiation images by searching for the corresponding positions between the two radiation images and by warping at least one of the radiation images refers to aligning the two radiation images by finding the corresponding positions between the two radiation images and then by warping one or both of the images so as to cause the corresponding positions to agree with each other.

In the case where the two radiation images are obtained by irradiating the radiations having different energy distributions on the body part including the two or more tissues having different radiation absorption characteristics and the alignment apparatus of the present invention further comprises component image generation means for generating component images represented by signal components of at least two of the tissues by carrying out subtraction processing on the two radiation images, the evaluation means may calculate the evaluation value by using the signal components at pixels corresponding to each other in the component images generated by the component image generation means.

Each of the component images refers to a tissue image generated by extraction of the signal component of a specific one of the tissues from the radiation images.

The evaluation value in the present invention may be obtained by evaluating independency representing whether the signal components are independent of each other between portions corresponding to each other in the two or more component images.

It is preferable for the independency to be evaluated by mutual information or by normalized mutual information.

In the case where the alignment means searches for a region corresponding to a local region of one of the two radiation images in a search area set in advance in the other radiation image, it is preferable for the search condition setting means to set the search area in such a manner that the larger the amount of positional shift represented by the evaluation value for each of the portions is, the wider the search area becomes. Consequently, the smaller the amount of positional shift is, the smaller the search area is set.

Alternatively, in the case where the alignment means searches for a region corresponding to a local region of one of the two radiation images in a search area set in advance in the other radiation image and finds as the corresponding region a region having high correlation with the local region in the search area, it is preferable for the search condition setting means to set the search condition so as to cause correlation between a sub-region in the search area and the local region to be estimated higher at a location where the distance from the center of the search area is large than at a location where the distance from the center of the search area is small in a region where the amount of positional shift represented by the evaluation value is large and so as to cause the correlation between the sub-region in the search area and the local region to be estimated lower at a location where the distance from the center of the search area is large than at a location where the distance from the center of the search area is small in a region where the amount of positional shift represented by the evaluation value is small.

The local region may be the portion where the evaluation value is calculated or a portion within the portion for the calculation.

The alignment apparatus of the present invention evaluates the amount of positional shift of the same tissue between the two radiation images for each of the portions of the radiation images, and aligns the two radiation images by setting for each of the portions the condition of search for the corresponding positions between the two radiation images according to the evaluation value thereof. Therefore, even in the case where the two radiation images include a portion wherein the amount of positional shift is large such as a portion including the heart in a chest image and a portion wherein the amount of positional shift is small such as a portion representing a bone, the two images can be aligned with accuracy.

In the case where subtraction processing is carried out on the two radiation images generated by the radiations of different energy distributions to generate the component images represented by the signal components of the at least two of the tissues, if the amount of positional shift is evaluated based on the signal components at the pixels corresponding to each other in the component images, the amount of positional shift can be accurately evaluated for the at least two of the tissues.

By obtaining the evaluation value by evaluation of the independency of the signal components between the portions corresponding to each other in the component images, how much each of the tissues has shifted can be evaluated accurately.

In addition, by changing the search area as the search condition according to the amount of positional shift so as to cause the search area to become larger as the amount of positional shift becomes larger (that is, to cause the search area to become smaller as the amount of positional shift becomes smaller), the corresponding positions can be detected in a region in accordance with the amount of positional shift, leading to accurate alignment of the images.

Alternatively, if the search condition is set so as to cause the correlation with the local region to be estimated higher at a location where the distance from the center of the search area is large than at a location where the distance from the centre of the search area is small in a region in which the amount of positional shift is large and so as to cause the correlation with the local region to be estimated lower at a location where the distance from the center of the search area is large than at a location where the distance from the center of the search area is small in a region in which the amount of positional shift is small, the corresponding positions can be detected in a region in accordance with the amount of positional shift, leading to accurate alignment.

BRIEF DESCRIPTION OF THE DRAWINGS

FIG. 6 shows an example of distribution of evaluation value regarding an amount of positional shift;

FIG. 9 shows the schematic configuration of another alignment apparatus; and

FIG. 10 shows the schematic configuration of still another alignment apparatus.

DESCRIPTION OF THE PREFERRED EMBODIMENT

Figure 1:
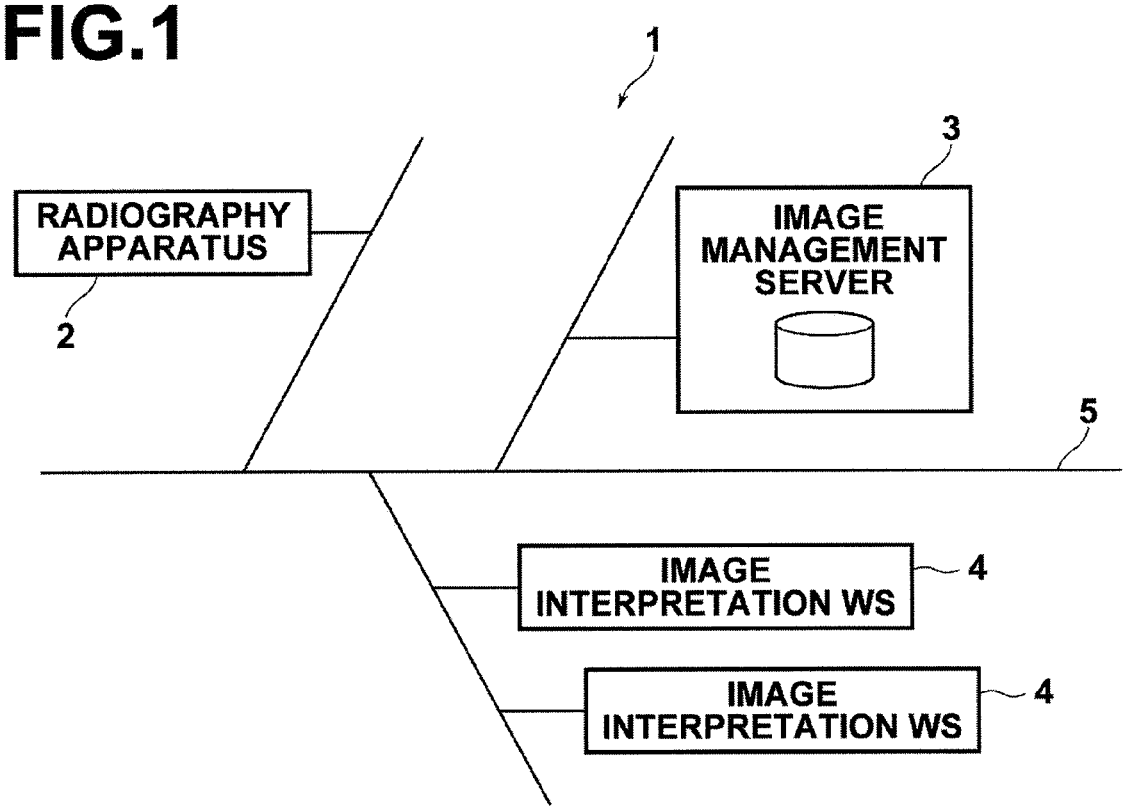
FIG. 1 shows the schematic configuration of a radiography system.

Hereinafter, an embodiment of the present invention will be described with reference to the accompanying drawings. FIG. 1 shows the schematic configuration of a radiography system 1 of the present invention. The radiography system 1 comprises a radiography apparatus 2, an image management server 3, image interpretation workstations 4, and a network 5. The radiography apparatus 2 radiographs radiation images by irradiating radiations having different energy distributions on a subject to be examined. The image management server 3 stores the radiation images obtained by the radiography apparatus 2. Each of the image interpretation workstations 4 displays component images generated by separation of signal components of different tissues having different radiation absorption characteristics, from two or more radiation images. The network 5 connects the respective apparatuses 2 to 4 described above.

The network 5 is a local area network that connects the apparatuses 2 to 4 in a hospital. In the case where a portion of the image interpretation workstations 4 is installed in another hospital or clinic, the network 5 may connect local area networks of the respective facilities via the Internet or a dedicated line. In either case, it is preferable for the network 5 to enable fast image information transfer as is realized by an optical network or the like.

The radiography apparatus 2 comprises a radiation emitter for emitting a radiation and a radiation detector such as an FPD for detecting the radiation having passed through a subject. The radiography apparatus 2 has a function to obtain a plurality of radiation images by irradiating radiations having different energy distributions (energy spectra) twice or more on the same body part of the same subject. More specifically, as has been disclosed in Japanese Unexamined Patent Publication No. 2005-245657 for example, the radiography apparatus 2 irradiates, on the same subject, the radiations having different energy spectra at an interval of several hundred milliseconds while changing a tube voltage of the radiation emitter, and the detector obtains the radiation images. It is preferable for the radiography apparatus 2 to have a transmission function that meets the DICOM (Digital Imaging and COmmunications in Medicine) standard. The radiography apparatus 2 sends the radiation images to the image management server 3.

The image management server 3 is connected to the radiography apparatus 2 by the network 5, and it is preferable for the image management server 3 to have a function to receive the radiation images obtained by the radiography apparatus 2, according to the DICOM standard. The image management server 3 stores the radiation images in a format according to the DICOM standard, together with information such as information on patient as the subject, radiographed body part, date of radiography, modality used in radiography (such as a radiography apparatus, an MRI apparatus, or a CT apparatus). In the case where the modality is the radiography apparatus, the information on modality includes radiography information (such as radiography conditions including tube voltage and configuration of stimulable phosphor sheet and filter or the like, radiography protocol, radiography sequence, radiography method, use or non-use of contrast agent/dye used, time elapsed after contrast agent injection, type of radiation, and radiation dose). The image management server 3 has database management software installed therein, and has a function to search for a radiation image by using the various kinds of information of the radiation images stored in the server. When the image management server 3 receives an image viewing request from any one of the image interpretation workstations 4 via the network 5, the image management server 3 searches the images stored therein, and sends an extracted one of the images to the image interpretation workstation 4 having requested the viewing.

When a user such as an imaging diagnostician operates any one of the image interpretation workstations 4 to request viewing of an interpretation target image, the image interpretation workstation 4 sends the viewing request to the image management server 3, and obtains the radiation image necessary for the interpretation. The image interpretation workstation 4 displays the radiation image on a monitor.

Each of the image interpretation workstation 4 has programs installed therein for alignment processing and component image generation processing. By execution of the programs, each of the image interpretation workstations 4 functions as an alignment apparatus and a component image generation apparatus. The programs are recorded in an information storage medium such as a CD-ROM, or distributed via a network such as the Internet, and installed in each of the image interpretation workstations 4.

Figure 2:
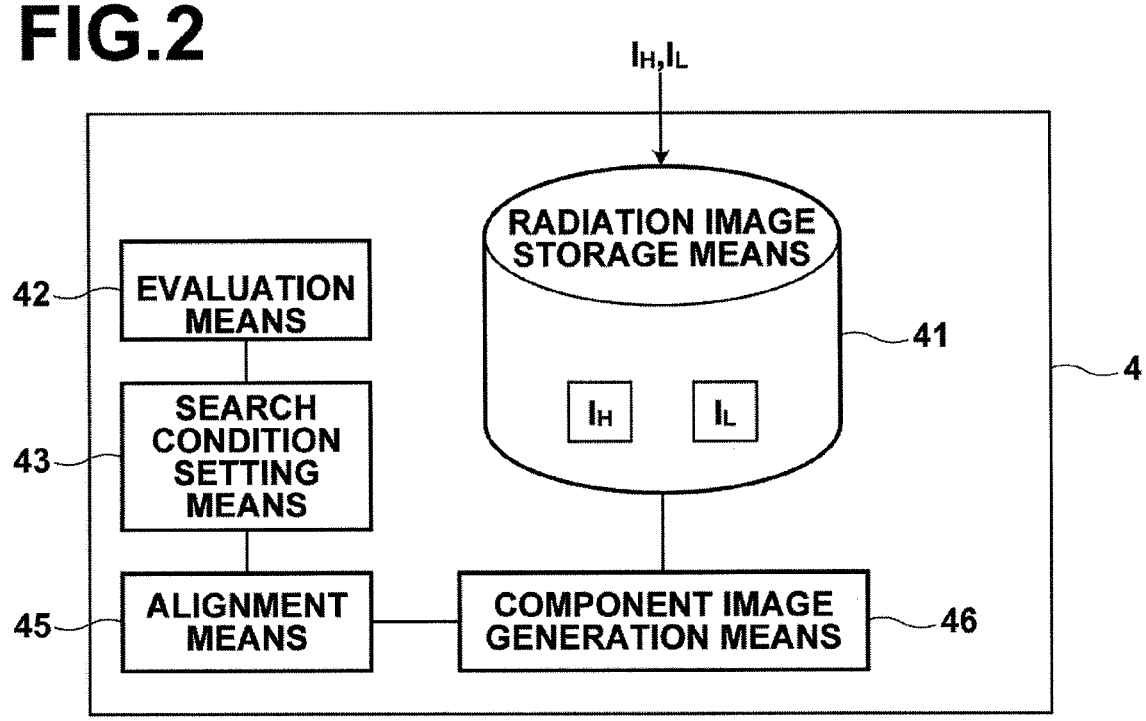
FIG. 2 shows the schematic configuration of an alignment apparatus.

As shown in FIG. 2, each of the image interpretation workstations 4 (the alignment apparatus) functions as radiation image storage means 41, evaluation means 42, search condition setting means 43, alignment means 45, and component image generation means 46, according to the programs installed therein. The radiation image storage means 41 stores two radiation images. The evaluation means 42 calculates an evaluation value that evaluates for each of portions of the images an amount of positional shift between tissues radiographed in the two images. The search condition setting means 43 sets for each of the portions a condition of search for corresponding positions between the two radiation images, according to the evaluation value regarding a corresponding one of the portions. The alignment means 45 searches for the corresponding positions between the two radiation images according to the search condition having been set, and aligns the two radiation images by warping at least one of the two images. The component image generation means 46 generates component images in which signal components of the respective tissues comprising the radiographed body part of the subject have been separated by subtraction processing on the two radiation images.

In this embodiment, the case will be described where the component images are generated from two radiation images (that is, a high-energy image $I_H$ and a low-energy image $I_L$) obtained by irradiating radiations having different energy distributions twice on the chest of the subject.

The radiation image storage means 41 is an auxiliary storage device such as a memory in a computer or a hard disc installed in a computer, and stores the radiation images (the high-energy image $I_H$ and the low-energy image $I_L$) received from the image management server 3.

Figure 3:
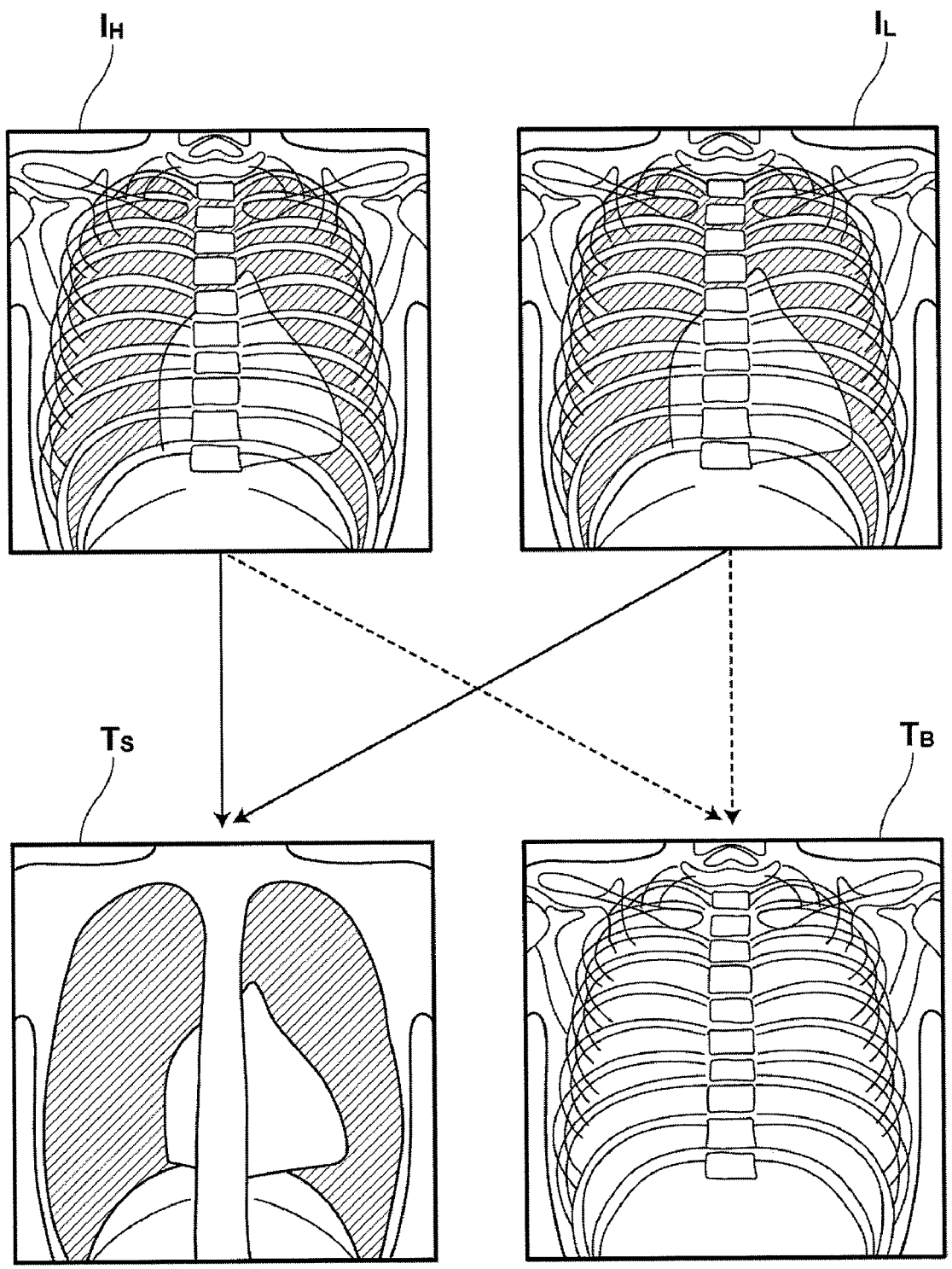
FIG. 3 shows how component images are generated.

By using the fact that respective tissues have different radiation absorption characteristics, the component image generation means 46 generates the component images representing distribution of the signal components of the respective tissues comprising the radiographed body part of the subject by separating the signal components from the high-energy radiation image $I_H$ and the low-energy radiation image $I_L$. More specifically, the component image generation means 46 carries out subtraction processing (or weighted addition processing) on the high-energy radiation image $I_H$ and the low-energy radiation image $I_L$, to decompose the chest images into a component image representing soft tissues (hereinafter referred to as a soft tissue image $T_S$) and a component image representing bones (hereinafter referred to as a bone image $T_B$), as shown in FIG. 3.

At a location where a positional shift has occurred in any of the radiographed tissues between the high-energy radiation image $I_H$ and the low-energy radiation image $I_L$, an artifact is observed in the component image $T_S$ and the component image $T_B$ generated by the component image generation means 46. Therefore, the component image generation means 46 usually generates the component image $T_S$ and the component image $T_B$ by using the high-energy radiation image $I_H$ and the low-energy radiation image $I_L$ having been subjected to alignment processing according to template matching or the like.

Figure 4:
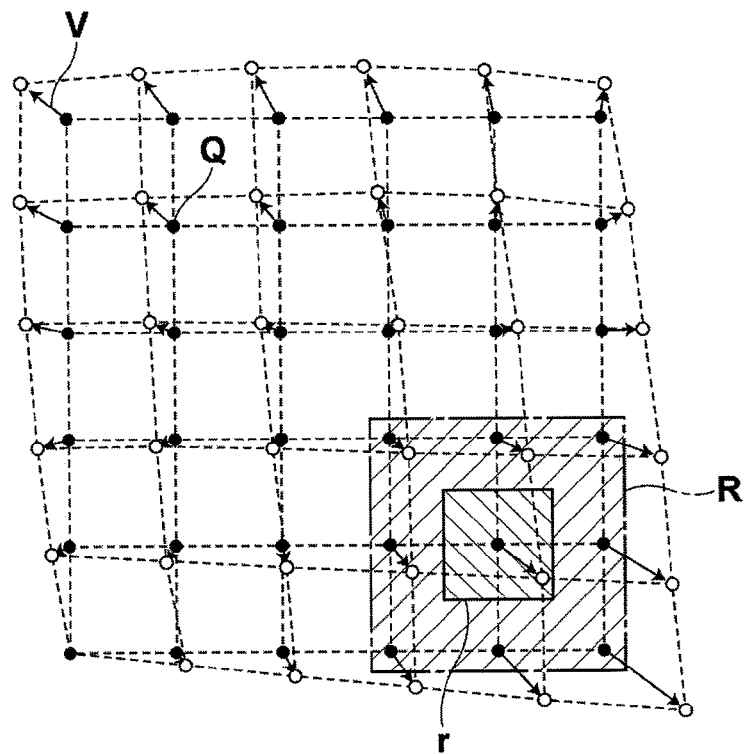
FIG. 4 shows a manner of template matching.

In template matching, as shown in FIG. 4, control points Q are disposed to form a grid-like pattern in the high-energy radiation image $I_H$, and a region corresponding to a local region (a template) r around each of the control points Q is searched for in a search area R in the low-energy radiation image $I_L$. For this search, correlation (a degree of similarity) is evaluated between the template r and a sub-region having a size corresponding to the template r in the search area R. A region in which the correlation becomes the highest is detected as the corresponding region. Furthermore, a point corresponding to the control point Q is found in the sub-region corresponding to the template r, and a shift vector V connecting the control point Q and the corresponding point is found. Warping is then carried out by interpolating the shift vectors V as shown in FIG. 4.

The search area R needs to be set to have an optimal size in consideration of computational cost and the amount of positional shift. For example, if the search area R is set small in the low-energy radiation image $I_L$ in order to reduce the computational cost, the region corresponding to the template r does not exist in the search area R in a region where the amount of positional shift is large between the high-energy radiation image $I_H$ and the low-energy radiation image $I_L$. Therefore, the corresponding region cannot be searched for accurately. However, if the search area R is set large in the low-energy radiation image $I_L$, the computational cost increases although the corresponding region can be found.

Figure 5:
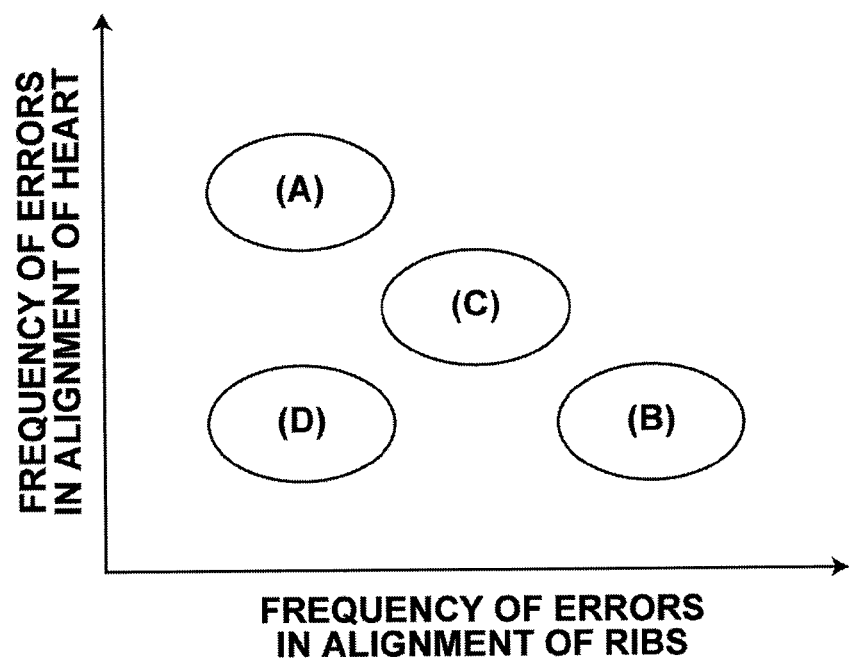
FIG. 5 is a graph showing the frequency of alignment errors in the case where a uniform search area is adopted over an entire image.

Even if the search area R is set large, the corresponding region cannot necessarily be searched for accurately. In the high-energy radiation image $I_H$ and the low-energy radiation image $I_L$ of the chest radiographed in two-shot method, the amount of positional shift varies between a portion representing a tissue of an organ in motion such as the heart or a tissue near such an organ and a portion representing a tissue of an unmoving organ such as ribs. Therefore, the amount of positional shift is small for the ribs while the amount of positional shift becomes large for the heart and adjacent blood vessels due to heartbeat. Now examine the frequency of alignment errors occurring around the heart and around the ribs in two radiation images at the time of template matching in the case where the size of the search area R is uniform over the entire image. As shown in FIG. 5, in the case where the search area R is set small, the errors occur in a region (A), meaning that the errors are comparatively infrequent around the ribs while the errors increase in the soft tissues near the heart showing larger motion than the ribs. On the contrary, in the case where the search area R is set large, the errors occur in a region (B), meaning that the errors are infrequent in the soft tissues but increase at the ribs. In the case where the search area R is set to have an intermediate size between the cases of (A) and (B), the errors occur in a region (C), representing the errors having intermediate characteristics. Based on these results, it is concluded that the alignment cannot be carried out sufficiently for both the ribs and the heart if the search area R is set to have a uniform size.

For this reason, the evaluation means 42 calculates the evaluation value that evaluates the amount of positional shift regarding the tissues radiographed in the high-energy radiation image $I_H$ and the low-energy radiation image $I_L$, for each portion of the high-energy radiation image $I_H$ and the low-energy radiation image $I_L$. More specifically, the component image generation means 46 generates preliminary component images $T_S^{pre}$ and $T_B^{pre}$ by using the high-energy radiation image $I_H$ and the low-energy radiation image $I_L$ not having been aligned, and the evaluation means 42 evaluates the amount of positional shift for each portion of the preliminary component images $T_S^{pre}$ and $T_B^{pre}$.

Since the soft tissues and the ribs in the chest respectively have radiation absorption characteristics specific thereto, the soft tissue image $T_S$ representing the signal component of the soft tissues alone and the bone image $T_B$ representing the signal component of the bones only are supposed to have the signal components that are independent of each other. However, in a region where the positional shift has occurred between the two radiation images $I_H$ and $I_L$, the signal components are estimated to be not independent of each other between the preliminary component images $T_S^{pre}$ and $T_B^{pre}$ generated from the radiation images $I_H$ and $I_L$. For example, if subtraction processing is carried out without alignment between the chest radiation images $I_H$ and $I_L$, a motion artifact appears around the heart at substantially the same position and size in the preliminary component images $T_S^{pre}$ and $T_B^{pre}$. In the portion where the motion artifact is observed, the signal components are extremely similar between the preliminary component images $T_S^{pre}$ and $T_B^{pre}$, which means that the independency is not held.

For this reason, by using the signal components for a portion at positions corresponding to each other in the preliminary component images $T_S^{pre}$ and $T_B^{pre}$, an evaluation value that evaluates the independency between the preliminary soft tissue image $T_S^{pre}$ and the preliminary bone image $T_B^{pre}$ can be found as the evaluation value regarding the amount of positional shift. As a criterion to evaluate independency of the signals, average mutual information is known. However, for actual calculation, normalized mutual information (NMI) that normalizes a range of values can be used as the evaluation value.

The mutual information refers to a criterion that quantifies an amount of information regarding a signal X in a signal Y. The normalized mutual information NMI(X,Y) is found according to Equation (1) below by calculating an entropy H(X) of the signal X, an entropy H(Y) of the signal Y, and a two-dimensional histogram (joint histogram, combined histogram, combined luminance histogram) Hist(x,y) regarding the signals X and Y. The entropy H(X) of the signal X is calculated from a probability density function p(x) of a value (a pixel value) x of the signal X. The entropy H(Y) of the signal Y is calculated in the same manner.

$$NMI(X, Y) = \frac{H(X) + H(Y)}{H(X, Y)} \quad (1)$$

$$\begin{cases} H(X) = -\sum_x p(x)\log_2 p(x) \\ H(Y) = -\sum_y p(y)\log_2 p(y) \\ H(X, Y) = -\sum_x \sum_y p(x, y)\log_2 p(x, y) \end{cases} \begin{cases} p(x) = \frac{1}{N}Hist(x) \\ p(y) = \frac{1}{N}Hist(y) \\ p(x, y) = \frac{1}{N}Hist(x, y) \end{cases}$$

where H is the entropy, p is the probability density function (that is, a relative frequency histogram), X and Y are the original signals, x and y are signal values (that is, pixel values), N is the number of samples (that is, the number of pixels), and Hist is the histogram.

In the case where the signal X and the signal Y are completely independent of each other, H(X,Y)=H(X)+H(Y). In the case where the signals X and Y are not independent, H(X,Y)<H(X)+H(Y). Since the smallest possible value for H(X,Y) is either a value of H(X) or H(Y), a value of NMI(X, Y) varies within a range [1,2]. In the case where the signals X and Y are completely independent of each other, NMI(X,Y)= 1. The larger the amount of information that overlaps grows, the larger the value of NMI(X,Y) becomes. In the case where the signal X is completely the same as the signal Y, NMI(X, Y)=2. Since the soft tissue image $T_S$ and the bone image $T_B$ obtained in the energy subtraction processing are supposed to have the signal components that are independent of each other, the independency of the signals can be evaluated through calculation of the value of NMI by using pixel values of the soft tissue image $T_S^{pre}$ and the bone image $T_B^{pre}$ as the values x and y of the signals X and Y.

The value of NMI at a pixel in the images can be found based on Equation (1), from pixels in a sub-region centering the pixel in the soft tissue image $T_S^{pre}$ and the bone image $T_B^{pre}$. It is desirable for the value of NMI to be found for all the pixels in the soft tissue image $T_S^{pre}$ and the bone image $T_B^{pre}$. However, in consideration of the computational cost, it is preferable for the value of NMI to be calculated from pixel values around each of the control points Q arranged in the grid-like pattern in the radiation images $I_H$ and $I_L$. FIG. 6 shows an example of distribution of the evaluation value regarding the amount of positional shift generated by calculation of the value of NMI from the soft tissue image $T_S^{pre}$ and the bone image $T_B^{pre}$. As shown in FIG. 6, the closer a position is from the heart, the larger the amount of positional shift is estimated thereat. In other words, the nearer a position is from the heart, the smaller the amount of positional shift is estimated thereat.

The search condition setting means 43 sets the search area R as the search condition at the time of template matching, according to the evaluation value found by the evaluation means 42. More specifically, the search condition setting means 43 sets the search area R larger for a portion where the amount of positional shift estimated from the evaluation value is larger. In other words, the smaller the amount of positional shift becomes, the smaller the search condition setting means 43 sets the search area R.

Figure 7:
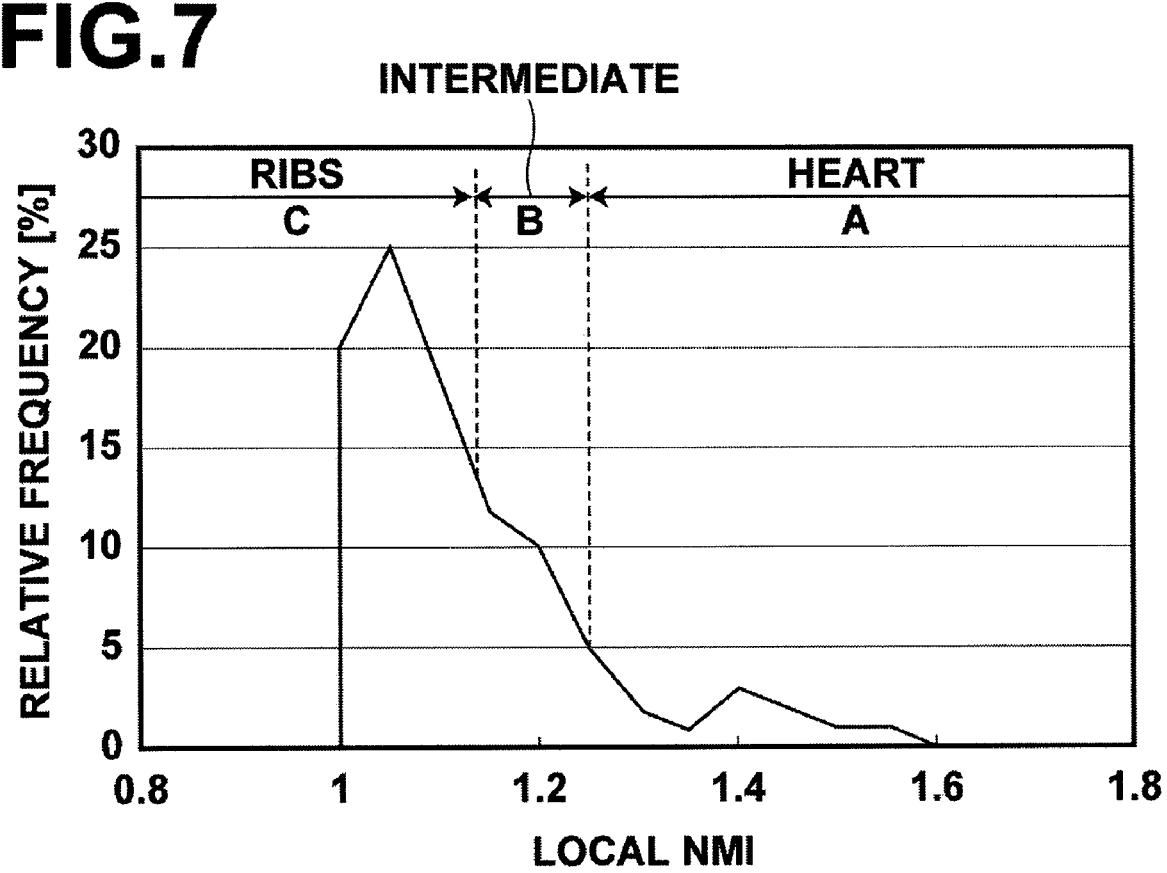
FIG. 7 is a graph showing how a search area is set according to the evaluation value (an NMI value) regarding the amount of positional shift.

Whether the positional shift is large or small can be judged by comparison of the evaluation value over the entire image. More specifically, a histogram of the value of NMI is generated as shown in FIG. 7 for the rib cage region of the chest radiation image, for example. As shown in a table below, a parameter is set according to ranges A to C of the NMI value. In the case where the value of NMI is in the range A, the search area R is set large, since a motion artifact around the heart is highly likely to appear in the range. In the case where the value of NMI is in the range C, the search area R is set small, since the range is highly likely to represent the small positional shift as for the ribs. In the case where the value of NMI is in the range B, the search area R is set to have an intermediate size, since a degree of the positional shift is thought to be intermediate.

TABLE 1

| Parameter | Region to Emphasize | Amount of Positional Shift | NMI Value | Search Area |
| --- | --- | --- | --- | --- |
| A | Heart | Large | Large | Wide: ±15 pixels |
| B | Intermediate | Intermediate | Intermediate | Intermediate: ±7.5 pixels |
| C | Ribs | Small | Small | Small: ±4 pixels |

The alignment means 45 searches the radiation image $I_L$ for the points corresponding respectively to the control points Q in the radiation image $I_H$, by using the template matching according to the search condition set by the search condition setting means 43. The alignment means 45 aligns the two radiation images by warping the radiation image $I_H$ (or the radiation image $I_L$) so as to align the control points Q in the radiation image $I_H$ to the corresponding points in the radiation image $I_L$.

When the corresponding points are searched for, the template r is cut around each of the control points Q arranged in the grid-like pattern in the radiation image $I_H$, and the region corresponding to the template r is searched for in the radiation image $I_L$. Around the heart where the evaluation value indicates that the amount of positional shift is large, the search condition setting means 43 has set the search area R to be large. Therefore, the point corresponding to the control point Q around the heart can be found by searching for the region corresponding to the template r as the region that is most similar to the template r in the large search area R. For the ribs where the evaluation value indicates that the amount of positional shift is small, the search condition setting means 43 has set the search area R to be small. Therefore, the alignment means 45 finds the point corresponding to the control point Q in the ribs by searching for the region corresponding to the template r as the region that is most similar to the template r in the small search area R. The alignment means 45 then finds the shift vectors V that connect the control points Q with the corresponding points, and aligns the radiation images $I_H$ and $I_L$ by warping through interpolation of the shift vectors V for pixels between each of the control points Q and the point corresponding thereto.

Figure 8:
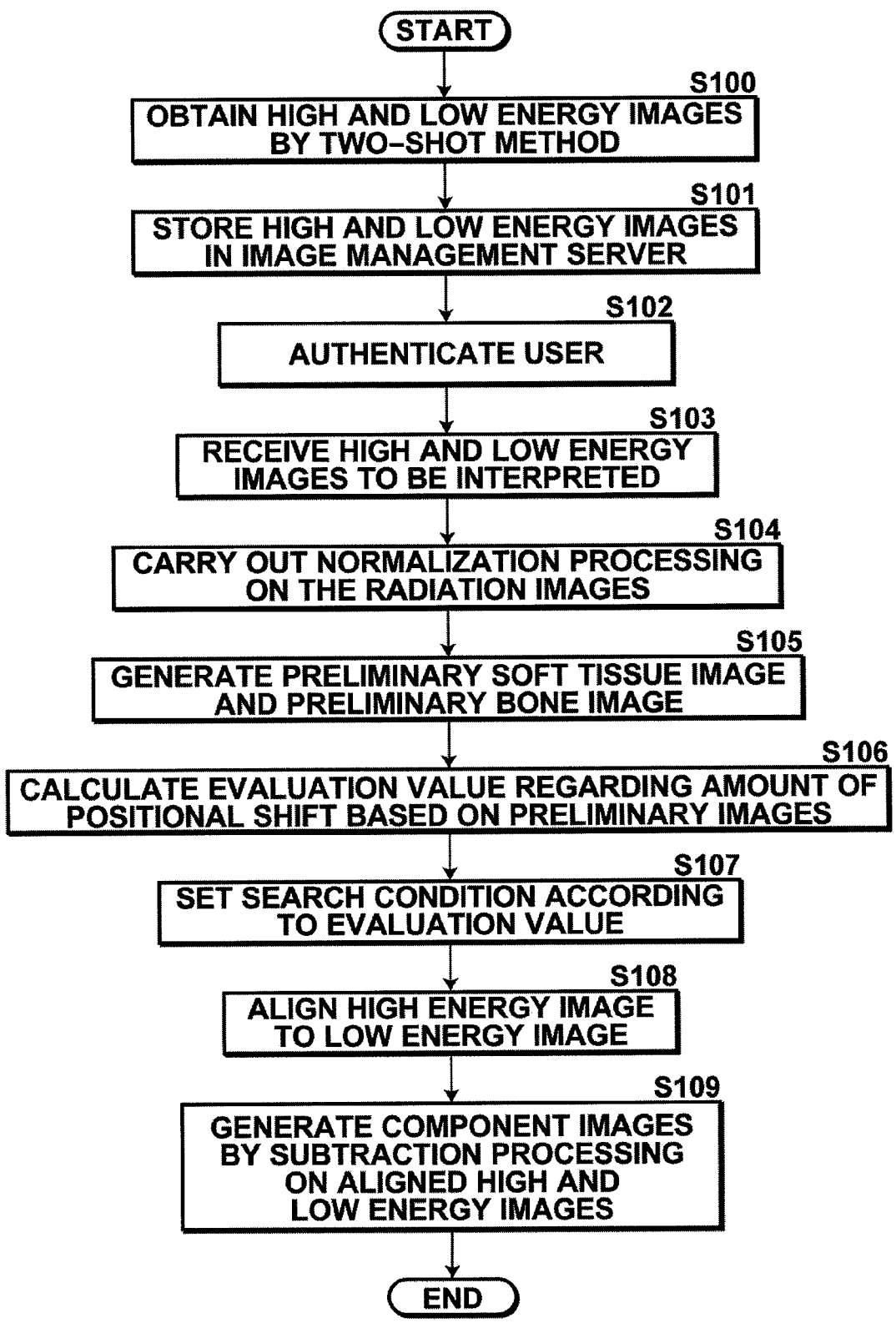
FIG. 8 is a flow chart showing the flow of processing to generate component images from two radiation images.

The flow of processing will be described next with reference to a flow chart in FIG. 8, to generate the component images from the two-shot chest radiation images obtained by the radiography system 1 of the present invention.

The radiography apparatus 2 irradiates the radiations having different energy distributions on the chest of the subject while changing the tube voltage thereof at an interval of 500 milliseconds or the like, to generate the two radiation images comprising the high-energy radiation image $I_H$ and the low-energy radiation image $I_L$ (S100). The high-energy radiation image $I_H$ and the low-energy radiation image $I_L$ are stored in the image management server 3, accompanying the information including the patient information regarding the subject, the radiographed body part, the date of radiography, and the radiography information (S101).

An imaging diagnostician accesses the radiography system 1 from any one of the image interpretation workstations 4, in order to interpret the radiation images $I_H$ and $I_L$. For this access, user authentication is carried out (S102) by input of user ID, password, biometric information such as fingerprint, and the like from the image interpretation workstation 4.

After the authentication has been successful, a list of examination (image interpretation) target images is displayed based on imaging diagnosis orders issued by an ordering system. The diagnostician selects examination (image interpretation) of the radiation images $I_H$ and $I_L$ from the examination target image list, by using an input device such as a mouse. The image interpretation workstation 4 sends a request of image viewing to the image management server 3 by using image IDs of the selected radiation images $I_H$ and $I_L$ as search keys. The image management server 3 sends the interpretation target radiation images $I_H$ and $I_L$ to the image interpretation workstation 4, based on the request. The image interpretation workstation 4 receives the radiation images $I_H$ and $I_L$, and stores the images in a hard disc as the radiation image storage means 41 (S103).

The image interpretation workstation 4 analyzes the content of a corresponding one of the imaging diagnosis orders. In the case where the image interpretation workstation 4 has judged that generation of the soft tissue image $T_S$ and the bone image $T_B$ is necessary by separation of the soft tissue component and the bone component from the radiation images $I_H$ and $I_L$, the image interpretation workstation 4 starts the program that causes the image interpretation workstation 4 to function as the alignment apparatus of the present invention and the component image generation apparatus.

The image interpretation workstation 4 carries out normalization processing on the radiation images $I_H$ and $I_L$ stored in the radiation image storage means 41 (S104). The component image generation means 46 generates the preliminary soft tissue image $T_S^{pre}$ and the preliminary bone image $T_B^{pre}$ by using the normalized radiation images $I_H$ and $I_L$ (S105). The preliminary soft tissue image $T_S^{pre}$ and the preliminary bone image $T_B^{pre}$ are generated without alignment processing on the radiation images $I_H$ and $I_L$.

Since the alignment means 45 searches for the points corresponding to the control points Q set in the grid-like pattern in the radiation image $I_H$ by using template matching, the control points are set in the soft tissue image $T_S^{pre}$ and the bone image $T_B^{pre}$ at the same intervals as in the template matching by the alignment means 45, and the evaluation means 42 finds the evaluation value regarding the amount of positional shift from the pixel values around each of the control points Q in the soft tissue image $T_S^{pre}$ and the bone image $T_B^{pre}$ (S106).

The search condition setting means 43 sets the search area R for the template matching according to the evaluation value regarding the amount of positional shift, for each of the control points Q (S107). The alignment means 45 cuts the template r centering each of the control points Q in the radiation image $I_H$, and searches for the region corresponding to the template r in the search area R set in the radiation image $I_L$ by the search condition setting means 43. In this manner, the alignment means 45 finds the points in the radiation image $I_L$ corresponding to the respective control points Q in the radiation image $I_H$, and finds the shift vectors V that respectively connect the control points Q in the radiation image $I_H$ and the corresponding points in the radiation image $I_L$. By interpolation of the shift vectors V as shown in FIG. 4, the alignment means 45 warps the radiation image $I_H$ (or the radiation image $I_L$) to align the two images (S108).

The component image generation means 46 generates the soft tissue image $T_S$ and the bone image $T_B$ by using the aligned radiation images $I_H$ and $I_L$ (S109). In this manner, the soft tissue image $T_S$ and the bone image $T_B$ can be obtained with reduced motion artifact.

By setting the search area R to be large for a portion where the amount of positional shift is estimated to be large while setting the search area R to be small for a portion where the amount of positional shift is estimated to be small at the time of template matching as has been described above, the corresponding region can be found with accuracy, and accurate alignment can be realized while suppressing occurrence of significant mal-registration. More specifically, the alignment errors can be contained within a region (D) shown in FIG. 5, for example.

The case has been described above where the search area R is set for each of the control points Q by evaluation of the amount of positional shift therefor. However, the evaluation value regarding the amount of positional shift may be calculated around each of the control points Q. For example, the image may be divided into regions so that the evaluation value can be found regarding a representative amount of positional shift for each of the divided regions. In this case, the search area R is set for each of the regions.

In the template matching described above, the search is carried out while changing the search area R. However, the search area R may be set to be comparatively large. In this case, in a region where the amount of positional shift is estimated to be large according to the evaluation value, the correlation between the template r and the sub-region in the search area R can be estimated higher as the distance from the center of the search area R becomes larger. On the other hand, in a region where the amount of positional shift is estimated to be small according to the evaluation value, the correlation between the template r and the sub-region in the search area R can be estimated lower as the distance from the center of the search area R becomes larger.

More specifically, in a region where the amount of positional shift is large, the search condition setting means 43 sets a weight to be small in a region where the distance from the center of the search area R is small and sets the weight larger as the distance from the center of the search area R becomes larger. In a region where the amount of positional shift is small, the search condition setting means 43 sets the weight to be large in a region where the distance from the center of the search area R is small and sets the weight smaller as the distance from the center of the search area R becomes larger. The alignment means 45 then finds a correlation evaluation value representing the correlation between the sub-region in the search area R and the template r by multiplying a correlation value between the sub-region in the search area R and the template r by the weight. The region where the correlation evaluation value is large is selected as the region corresponding to the template r.

By causing the correlation to be estimated higher as the distance from the center of the search area R becomes larger in a region where the amount of positional shift is estimated to be large, the point corresponding to the control point Q can be detected at a position away from the center of the search area. In other words, in the case where two or more sub-regions having approximately the same correlation exist in the search area R, the sub-region located farthest from the center of the area R is judged to be the corresponding region wherein the point corresponding to the control point Q is detected. On the contrary, in a region where the amount of positional shift is estimated to be small, by causing the correlation to be estimated higher as the distance from the center of the search area R becomes smaller, the point corresponding to the control point Q is detected near the center of the search area R.

In the template matching, a difference in coordinates between each of the control point Q and the point corresponding thereto is found as the shift vector V for the control point Q. The magnitude of the shift vector V is represented by the number of pixels. However, some organs (tissues) shift by a magnitude smaller than the intervals between the pixels. Therefore, it is preferable for the search regarding the template r to be accurate enough so that the shift vector V can be found to a degree of sub-pixel accuracy. In the case where the search is carried out to the degree of sub-pixel accuracy, pixel values need to be found at positions where no pixels (sampling points) actually exist. Consequently, interpolation processing is carried out by using surrounding pixel values, to achieve the sub-pixel accuracy of calculation. By the template matching in the sub-pixel accuracy, the accuracy of alignment improves while the processing time increases dramatically due to the strenuous search. For this reason, by using multiple resolution decomposition and repetitive coarse-to-fine processing, local alignment processing is carried out first to search roughly, and alignment processing is repetitively carried out thereafter with gradually increasing accuracy, to suppress the computational cost.

In the above description, the search area and the correlation evaluation value are changed according to the evaluation value regarding the amount of positional shift at the time of template matching. In this manner, in a region where the amount of positional shift is large, the corresponding region is found at a location farther from the control point while the corresponding region is found at a location closer to the control point in a region where the amount of positional shift is small. However, the same result may be obtained by changing the number of warping processing executions, the template size, the search accuracy, or the intervals between the control points.

For example, the larger the number of the warping processing executions is, the higher the accuracy of final alignment becomes. Therefore, in a region where the amount of positional shift is large, the alignment can be carried out stably and accurately over the entire images by increasing the number of warping processing executions to improve accuracy of alignment therein.

Meanwhile, the larger the template size is, the farther pixels from a target pixel (the pixel at the center of the template) are used for the template matching. Therefore, in a region where the amount of positional shift is large, the matching accuracy improves by increasing the template size, since a positional shift is highly likely to have occurred in a region far from the target pixel. On the contrary, in a region where the amount of positional shift is small, the matching accuracy improves by decreasing the template size, since a positional shift is not likely to have occurred in a region far from the target pixel.

In general, a preferable result can be obtained in the alignment if the search accuracy is improved to the sub-pixel level. In energy subtraction processing, the alignment accuracy is important in the ribs. Therefore, the search accuracy needs to be improved in a region where the amount of positional shift is small. In a region where the amount of positional shift is large, preferable alignment can be realized by degrading the search accuracy to reduce an unnatural artifact caused by forcible warping processing.

Alternatively, the search accuracy may be changed according to the accuracy desired by a user. Especially, in the case where the improvement in the alignment accuracy is desired by emphasizing the ribs, the search accuracy is raised in a region where the amount of positional shift is small. In the case where the improvement in the alignment accuracy is sought by emphasizing the heart, the search accuracy is increased in a region where the amount of positional shift is large.

Meanwhile, the smaller the intervals between the control points are, the more locally the warping can be carried out. Therefore, in a region representing a rigid body (a body part that is not a soft tissue) such as the ribs where the amount of positional shift is small, local deformations caused by mal-registration can be suppressed by setting the intervals between the control points to be large. On the contrary, in a region representing a soft tissue such as the heart where the amount of positional shift is large, the intervals between the control points are set to be small. In this manner, the local deformations can be dealt with, which leads to improved alignment accuracy.

In the description above, the amount of positional shift is evaluated by evaluating the independency based on the two component images. However, without generation of the component images, the amount of positional shift may be evaluated based on texture of the original radiation images.

As shown in FIG. 9, an alignment apparatus 4 in this case has the radiation image storage means 41, evaluation means 42a, the search condition setting means 43, and the alignment means 45. The evaluation means 42a finds an evaluation value by evaluating the amount of positional shift according to the texture of the original radiation images stored in the radiation image storage means 41, and the search condition setting means 43 sets the search condition according to the evaluation value. Thereafter, the alignment means 45 aligns the two radiation images.

Alternatively, the search condition may be set based on the anatomical knowledge of each tissue. For example, by paying attention to the fact that the amount of positional shift is large around the heart while it is small at the bones, each tissue (or organ) such as the heart, the ribs, or the like may be detected in the original radiation images. In this case, a portion around the heart is set with the search condition for the case of large amount of positional shift while a portion of the ribs is set with the search condition for the case of small amount of positional shift.

As shown in FIG. 10, an alignment apparatus 4 in this case has the radiation image storage means 41, search condition setting means 43b, and the alignment means 45. The search condition setting means 43b detects each tissue such as the heart or the ribs in either one of the radiation images stored in the radiation image storage means 41, and sets for a portion around the heart the search condition for the case of large amount of positional shift while sets for a portion of the ribs the search condition for the case of small amount of positional shift. Thereafter, the alignment means 45 aligns the two radiation images.

In the description above, the radiation images are chest radiation images. However, the present invention can also be applied to another body part including both a tissue of large amount of positional shift and a tissue of small amount of positional shift.

In the description above, the image interpretation workstations 4 are used for the alignment. However, in order to enable confirmation of the alignment result on a console of the radiography apparatus, the functions described above may be incorporated in a control unit of the radiography apparatus.

The radiography apparatus in this case aligns the two radiation images to each other, and the component images are generated from the aligned radiation images.

As has been described above in detail, by estimating the amount of positional shift before the actual alignment, the condition for accurate alignment can be set in advance, and the alignment can be carried out with accuracy according to the condition.

What is claimed is:

1. An alignment apparatus comprising:
   radiation image storage means for storing two radiation images obtained by irradiating radiations on a predetermined body part including two or more tissues;
   evaluation means for calculating an evaluation value that evaluates an amount of positional shift of the radiographed tissues between the two radiation images, in each of portions of the two radiation images;
   search condition setting means for setting for each of the portions of the two radiation images a condition of search for corresponding positions between the two radiation images, according to the evaluation value obtained by the evaluation means regarding a corresponding one of the portions of the two radiation images; and
   alignment means for aligning the two radiation images by searching for the corresponding positions according to the search condition having been set and by warping at least one of the two radiation images, wherein
   the two radiation images being obtained by irradiating the radiations having different energy distributions on the body part including the two or more tissues having different radiation absorption characteristics,
   the alignment apparatus further comprising component image generation means for generating component images regarding at least two of the tissues represented by signal components of the at least two of the tissues by carrying out subtraction processing on the two radiation images, and
   the evaluation means calculating the evaluation value, by using the signal components at pixels corresponding to each other in the component images generated by the component image generation means.

2. The alignment apparatus according to claim 1, wherein the evaluation value is obtained by evaluating independency representing whether the signal components are independent of each other between portions corresponding to each other in the two or more component images.

3. The alignment apparatus according to claim 2, wherein the independency is evaluated by mutual information or by normalized mutual information.

4. The alignment apparatus according to claim 2, wherein the alignment means searches for a region corresponding to a local region of one of the two radiation images in a search area set in advance in the other radiation image, and
   the search condition setting means sets the search area in such a manner that the larger the amount of positional shift represented by the evaluation value for each of the portions is, the wider the search area becomes and in such a manner that the smaller the amount of positional shift represented by the evaluation value for each of the portions is, the smaller the search area becomes.

5. The alignment apparatus according to claim 2, wherein the alignment means searches for a region corresponding to a local region of one of the two radiation images in a search area set in advance in the other radiation image and finds as the corresponding region a region having high correlation with the local region in the search area, and
   the search condition setting means sets the search condition so as to cause correlation between a sub-region in the search area and the local region to be estimated higher at a location where the distance from the center of the search area is large than at a location where the distance from the center of the search area is small in a region where the amount of positional shift represented by the evaluation value is large and so as to cause the correlation between the sub-region in the search area and the local region to be estimated lower at a location where the distance from the center of the search area is large than at a location where the distance from the center of the search area is small in a region where the amount of positional shift represented by the evaluation value is small.

6. The alignment apparatus according to claim 1, wherein the alignment means searches for a region corresponding to a local region of one of the two radiation images in a search area set in advance in the other radiation image, and
   the search condition setting means sets the search area in such a manner that the larger the amount of positional shift represented by the evaluation value for each of the portions is, the wider the search area becomes and in such a manner that the smaller the amount of positional shift represented by the evaluation value for each of the portions is, the smaller the search area becomes.

7. The alignment apparatus according to claim 1, wherein the alignment means searches for a region corresponding to a local region of one of the two radiation images in a search area set in advance in the other radiation image, and
   the search condition setting means sets the search area in such a manner that the larger the amount of positional shift represented by the evaluation value for each of the portions is, the wider the search area becomes and in such a manner that the smaller the amount of positional shift represented by the evaluation value for each of the portions is, the smaller the search area becomes.

8. The alignment apparatus according to claim 1, wherein the alignment means searches for a region corresponding to a local region of one of the two radiation images in a search area set in advance in the other radiation image and finds as the corresponding region a region having high correlation with the local region in the search area, and
   the search condition setting means sets the search condition so as to cause correlation between a sub-region in the search area and the local region to be estimated higher at a location where the distance from the center of the search area is large than at a location where the distance from the center of the search area is small in a region where the amount of positional shift represented by the evaluation value is large and so as to cause the correlation between the sub-region in the search area and the local region to be estimated lower at a location where the distance from the center of the search area is large than at a location where the distance from the center of the search area is small in a region where the amount of positional shift represented by the evaluation value is small.

9. The alignment apparatus according to claim 1, wherein the alignment means searches for a region corresponding to a local region of one of the two radiation images in a search area set in advance in the other radiation image and finds as the corresponding region a region having high correlation with the local region in the search area, and the search condition setting means sets the search condition so as to cause correlation between a sub-region in the search area and the local region to be estimated higher at a location where the distance from the center of the search area is large than at a location where the distance from the center of the search area is small in a region where the amount of positional shift represented by the evaluation value is large and so as to cause the correlation between the sub-region in the search area and the local region to be estimated lower at a location where the distance from the center of the search area is large than at a location where the distance from the center of the search area is small in a region where the amount of positional shift represented by the evaluation value is small.

10. A computer-readable recording medium storing a program that causes a computer to function as:

evaluation means for calculating an evaluation value that evaluates an amount of positional shift of two or more tissues radiographed in two radiation images obtained by irradiating radiations on a predetermined body part including the two or more tissues, in each of portions of the two radiation images;

search condition setting means for setting for each of the portions of the two radiation images a condition of search for corresponding positions between the two radiation images, according to the evaluation value obtained by the evaluation means regarding a corresponding one of the portions of the radiation images; and alignment means for aligning the two radiation images by searching for the corresponding positions between the two radiation images according to the search condition having been set and by warping at least one of the two radiation images, and wherein the two radiation images being obtained by irradiating the radiations having different energy distributions on the body part including the two or more tissues having different radiation absorption characteristics, the alignment apparatus further comprising component image generation means for generating component images regarding at least two of the tissues represented by, signal components of the at least two of the tissues by carrying out subtraction processing on the two radiation images, and the evaluation means calculating the evaluation value, by using the signal components at pixels corresponding to each other in the component images generated by the component image generation means.

* * * * *